(12) United States Patent
Wakalopulos

(10) Patent No.: US 6,239,543 B1
(45) Date of Patent: May 29, 2001

(54) ELECTRON BEAM PLASMA FORMATION FOR SURFACE CHEMISTRY

(75) Inventor: George Wakalopulos, Pacific Palisades, CA (US)

(73) Assignee: American International Technologies, Inc., Torrance, CA (US)

(*) Notice: Subject to any disclaimer, the term of this patent is extended or adjusted under 35 U.S.C. 154(b) by 0 days.

(21) Appl. No.: 09/379,543

(22) Filed: Aug. 23, 1999

(51) Int. Cl.⁷ .............................. H01J 37/30; H01J 33/00
(52) U.S. Cl. .................. 313/420; 313/421; 250/492.3; 250/400
(58) Field of Search .................. 313/420, 421, 313/426, 452, 239, 348, 349, 352; 250/492.3, 400

(56) References Cited

U.S. PATENT DOCUMENTS

| | | | |
|---|---|---|---|
| Re. 35,203 | | 4/1996 | Wakalopulos ............... 250/492.3 |
| 5,414,267 | * | 5/1995 | Wakalopulos ............... 250/492.3 |
| 5,508,075 | | 4/1996 | Roulin et al. ............... 428/35.7 |
| 5,612,588 | * | 3/1997 | Wakalopulos ............... 313/420 |
| 5,637,953 | | 6/1997 | Wakalopulos ............... 313/421 |
| 5,909,032 | | 6/1999 | Wakalopulos ............... 250/492.3 |

* cited by examiner

Primary Examiner—Ashok Patel
(74) Attorney, Agent, or Firm—Thomas Schneck

(57) ABSTRACT

One or more electron beam tubes are arranged to direct electron beams in air or other ambient gas toward a target object. The electron beams ionize air producing a plasma or glow discharge. An electric or magnetic field in the beam trajectory sustains the plasma by trapping secondary electrons formed by collisions of beam electrons with the ambient atmosphere. Target objects may be placed in the field for surface treatment, such as sterilization, or for thin film growth. In the latter case, the apparatus is enclosed in a housing and a reactive gas is introduced into the beam trajectory. The gas is one which is crackable by the electron beam or plasma, such as an organic silicon compound which would liberate silicon for combination with ionized oxygen to form silicon dioxide layers on a substrate.

27 Claims, 4 Drawing Sheets

ELECTRON BEAM PLASMA FORMATION FOR SURFACE CHEMISTRY

TECHNICAL FIELD

The invention relates to formation of electron beam sustained high pressure gas plasmas for use in surface chemistry, including thin film deposition, grafting, cleaning, depyrogenation, and sterilization of surfaces.

BACKGROUND ART

Surface chemistry means the instigation of chemical reactions upon or within surfaces. In the former case, growth of thin films or inactivation of organic matter, such as bacteria or its byproducts known as pyrogens, is known to occur using ion or electron beams, usually at low pressure. In the latter case, certain surfaces, such as silicon, can be converted to oxides with surface reactions. An example of such conversion is the conversion of the surface of a silicon wafer to silicon dioxide by introducing a reactive oxygen species near the wafer surface, usually in vacuum.

In U.S. Pat. No. 5,508,075 A. Roulin et al. disclose formation of an oxygen barrier layer on a surface as a packaging laminate. A plasma is formed in a vacuum chamber in order to carry out plasma enhanced chemical vapor deposition (PECVD). Organic silicon compounds are combined with oxygen within the plasma such that the two compounds react and are deposited upon and chemically bonded to the surface. Silicon oxide can be formed directly on the surface. The patent indicates that preferred substrates or surfaces are flexible thermoplastic materials.

It is known that electron beams are useful for surface treatments. In U.S. Pat. No. 5,909,032 G. Wakalopulos discloses an arrangement of electron beam tubes which produce a linear or stripe-like electron beam suitable for surface treatment. The Wakalopulos patent features electron beam tubes which are sealed vacuum tubes emitting a beam through a thin window into an ambient environment, such as air, a relatively high pressure environment compared to the vacuum environment of the interior of the tube where the electron beam is generated. The construction of the Wakalopulos tube is shown in U.S. Pat. Nos. 5,637,953 and 5,414,267, both assigned to the assignee of the present invention.

The above mentioned beam tubes produce electron beams which interact with air, causing ionization of the air, creating secondary electrons which participate, together with the primary electrons of the beam, in surface treatment. One of the problems which is encountered is that the beam is evanescent, quickly become neutralized. Since the beam is continuous, the evanescent nature of the beam is not important for some applications. In other applications, a more persistent beam is needed to achieve the desired effect.

Electron beams have previously been used for sterilization. However, in many cases a residue of proteinaceous material is left because microorganism debris tenaciously adheres to a surface. The disabling of the microorganism does not necessarily disable the chemical bonds retaining the microorganism to a surface.

An object of the invention was to devise a high pressure electron beam tube apparatus with a persistent beam for surface sterilization, and a sustainer discharge for inactivation of proteinaceous material from treated surfaces.

Another object of the invention was to devise a high pressure plasma apparatus for chemical vapor deposition, grafting, and in particular thin film formation.

SUMMARY OF THE INVENTION

The above object has been achieved using a Wakalopulos electron beam tube plus an exterior field, electric or magnetic, to momentarily confine charged particles generated by the electron beam, with beam energy under 100 kV, emitted by the tube. The effect of the exterior confinement field is to sustain a gas plasma built by the electron beam interaction with air or other gases. The structure outside of the beam tube can be at ambient temperature and pressure, such as an air environment or other special purpose gases.

In the case of an electric field, an anode and cathode outside of beam tube is used. Closest to the tube is a screen anode which allows the electron beam to pass through the screen. At a slightly further distance is a damper cathode which will repel electrons back towards the screen anode, forming an electron trap. As the electron beam egresses the beam tube, electrons ionize air molecules forming a plasma which is almost neutral, except for an excess of electrons due to the electron beam, similar to a glow discharge. Secondary electrons, as well as a substantial fraction of beam electrons, impinge on objects between the screen anode and the damper cathode. The beam tube produces a stripe shaped beam which reacts in a swath on target surfaces. A belt or web carrying objects into the plasma can expose surfaces of such objects to the electrons for surface treatment.

In the case of a magnetic field, a coil outside of the beam tube is used. The coil may have a field with an axis parallel to the beam tube or at an angle to the tube axis. Electrons from the beam tube follow magnetic flux lines, so an article with surfaces to be sterilized, such as a vial, is placed in the flux path. For sterilization, the plasma disables microorganisms and interacts with the molecular residue on the surfaces, causing depyrogenation, allowing the surfaces to be free from infectious organic matter. Ash can be removed by simple washing in pure water after depyrogenation.

The screen anode and damper cathode electrodes or the coil structure tend to sustain the field making higher density and longer lasting plasmas than the evanescent plasmas usually associated with electron beams in air. Such a plasma is said to exist in a sustainer field which is energized by an independent power supply.

If the plasma is created in an inert environment in a sealed housing, special gases can be introduced into the electron beam which will interact with the beam. An example of such gases is organic silicon gases which decompose into silicon dioxide or similar film materials which can be grown merely by introducing organic silicon gases into the beam. Similarly, other decomposing gases can be introduced for plasma enhanced chemical vapor deposition (PECVD).

BEST MODE FOR CARRYING OUT THE INVENTION

Figure 1:
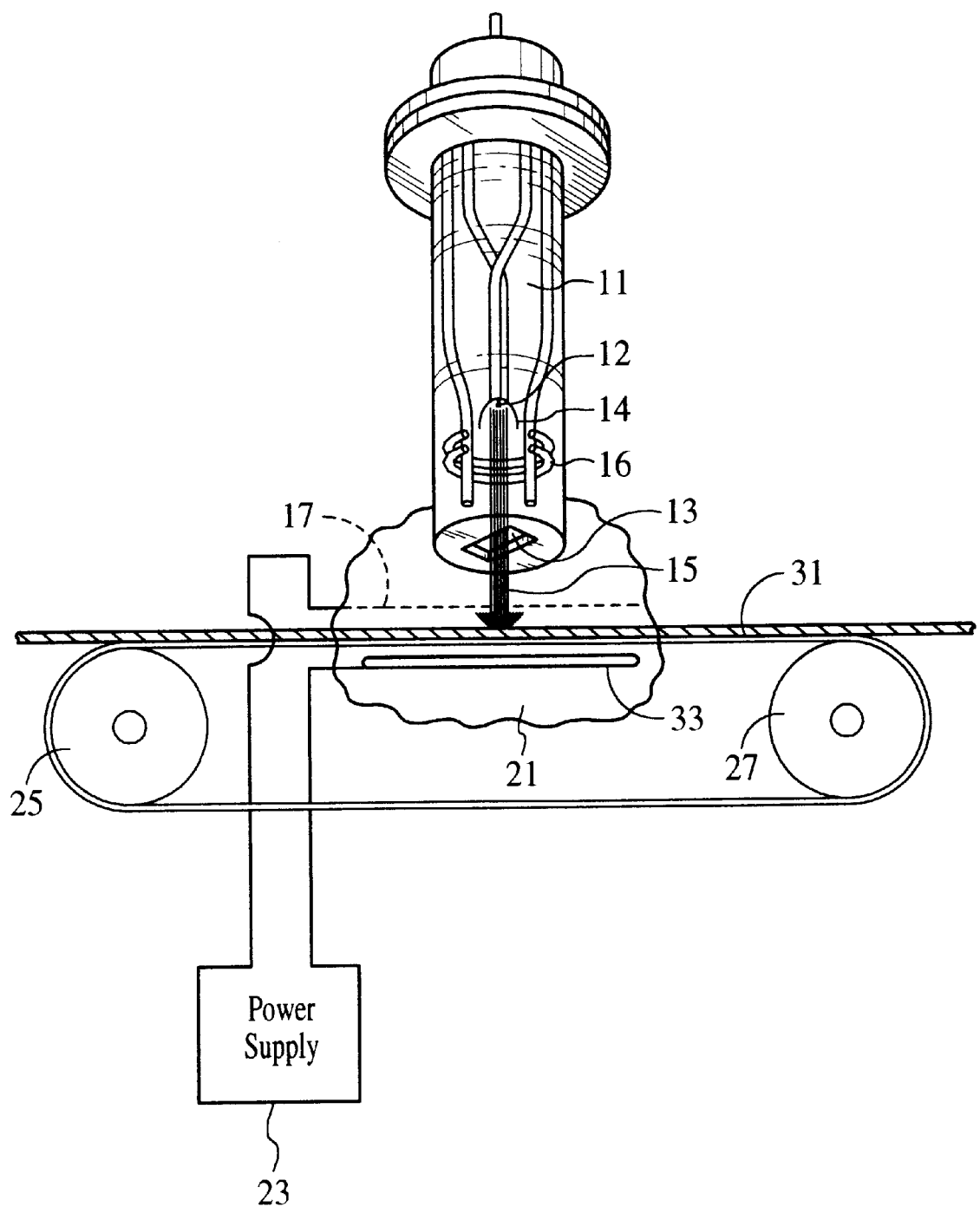
FIG. 1 is a side plan view of an electron beam tube emitting an electron beam into an electric sustainer field for surface treatment of a web of material.

With reference to FIG. 1, an electron beam tube 11 is shown to have a thin window 13 through which a beam 15 emerges. Beam 15 is generated from a cathode 12 in front of an electrostatic focusing structure 14 and is further focused by a magnetic field generated by the helical coil 16. The detailed structure of beam tube 11 may be found in U.S. Pat. No. 5,612,588 to G. Wakalopulos, assigned to the assignee of the present invention. The thin window 13 is only a few micrometers in thickness, or less, so that there is very little beam energy loss in penetrating the window. The window is preferably made of a material having a low atomic number so that electrons can readily penetrate the material, but gas molecules can not. This allows the interior of the tube to be at vacuum pressure while the outside of the tube is at ambient pressure, usually atmospheric pressure. The window, acting as an anode, is maintained at ground potential for safety reasons, while the cathode is maintained at a negative potential, for example −50 (kV) relative to the electrical potential of the window. If approximately 50% of the beam energy is lost in collisions with gas molecules outside of window 13, almost half the original beam energy will remain for delivery to a target surface. Such an electron energy level is sufficient for surface sterilization of various materials, but is insufficient to penetrate the surface of most target materials for more than a few tens of micrometers. This is because unlike the thin tube window which is 3 microns thick, the target materials are much thicker and the low energy beam cannot penetrate to any appreciable depth.

Beam 15 passes through a screen anode 17 which may be at the electrical potential of the window. The screen anode resembles wire mesh aluminum door screening. The beam ionizes gas as it passes the screen anode, generating secondary electrons, forming a room temperature gas plasma, with a substantial fraction of electrons available for surface treatment of web 31. A repeller cathode 33, for example a wire loop at a large negative potential, e.g. −1000 volts, deflects and repels electrons from the beam back towards the anode thereby sustaining the plasma.

Beam 15 is seen to be directed out of the window 13 toward web 31 which is either a surface be treated, or carries surface to be treated, e.g. sterilized. The size of the window 13 is sufficiently large to create a plasma cloud 21 consisting of the electrons in beam 15 and ionized gas from the ambient environment. This plasma, sustained by screen anode 17 and repeller cathode 33, is operative on the target surface in the plasma, namely web 31.

A power supply may be either a d.c. supply or an a.c. supply. In the latter case, radio frequencies are preferable for confining the plasma to a volume between the electrodes. A typical r.f. frequency would be in the range of 13 to 27 MHz.

The surface to be treated is spooled from a roll 25 and maintained under tension by a take-up roll 27. The supply roll 25 and the take-up roll 27 can provide an endless feed of material to be treated in the plasma volume. Alternatively, the surface to be treated could be carried on a conveyor in the manner of silicon wafers during device manufacture.

Figure 2:
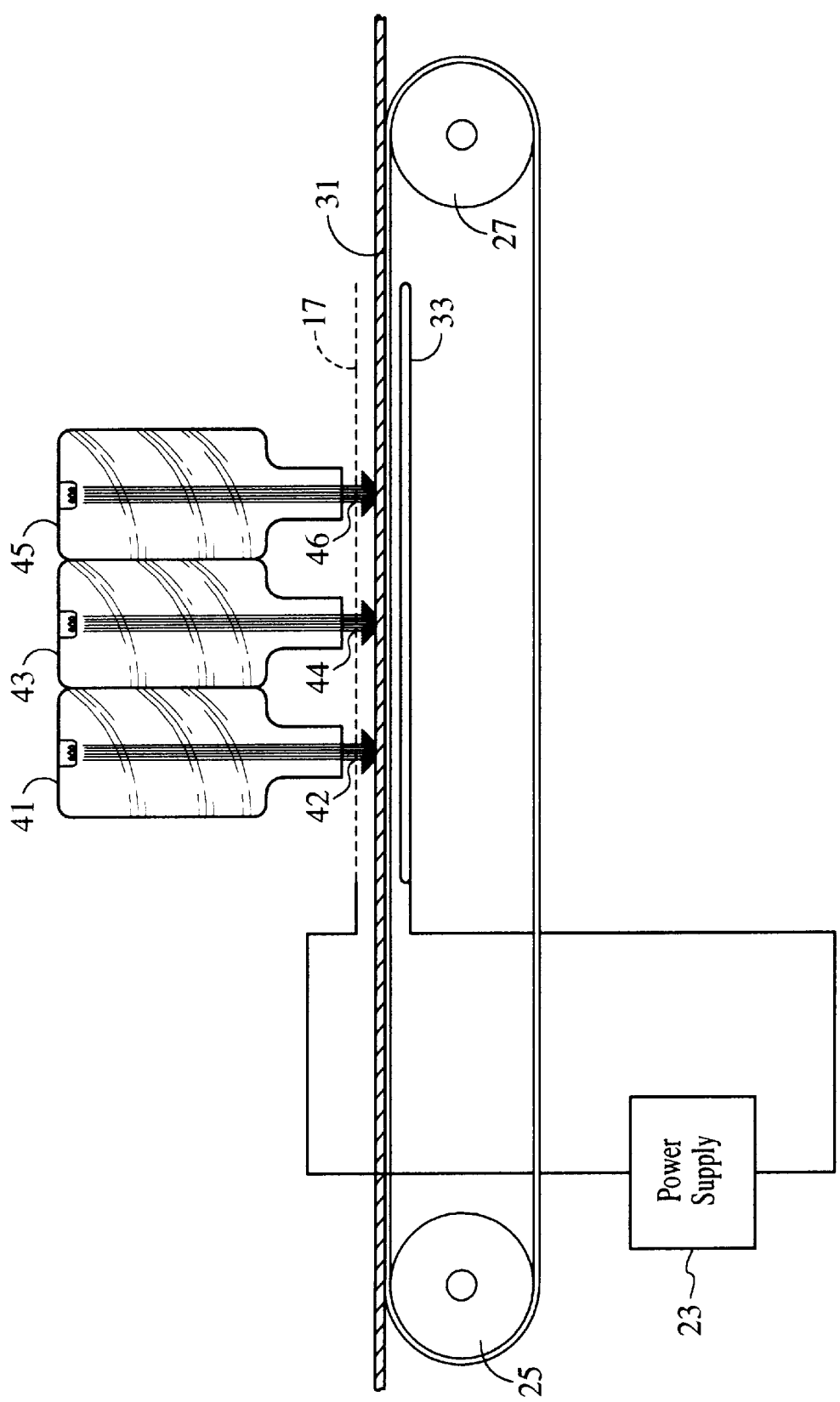
FIG. 2 is a side plan view of a plurality of electron beam tubes for emitting a plurality of beams into a single electric sustainer field for treatment of a web of material.

In FIG. 2, a linear array of tubes 41, 43, 45 generates respective electron beams 42, 44, 46 impinging upon web 31 spaced between screen anode 17 and repeller cathode 33. The construction of the tubes 41, 43, 45 is similar to beam tube 11 in FIG. 1. The emergent electron beams 42, 44, 46 are stripe-like beams which can be arranged to span the width of web 31 so that the entirety of the web surface can be treated as material that is spooled from the supply web 25 to the take-up web 27. Any number of beam tubes may be placed in an array so that the complete width of the web can be treated by electron beams emergent from the beam tubes. Once again, a gaseous plasma is formed between the screen anode 17 and the repeller electrode 13. The gas plasma is sustained by the power supply 23 which provides a ground or positive voltage to screen out 17 and a negative voltage to repeller cathode 33 in the d.c. mode.

By combining a plurality of tubes, a larger swath on a surface may be treated. The tubes may be aligned so that the beams stripes are side-by-side spanning a width of material, or staggered, one slightly behind the other, with a slight amount of overlap so that the beams span the width of a material. Although the drawing of FIG. 2 appears to show the tubes with beams along the length of the stripe, the beams are actually in width-wise direction of the web in the staggered manner described above. The beams operate in air causing ionization of the air and a glow discharge in the volume between the screen anode and repeller cathode. This discharge in combination with the beam, serves to treat surfaces for curing, sterilization, or initiation of chemical reactions some of which would result in thin film growth, as now done in chemical vapor deposition, on a silicon wafer. It is an alternative to an air environment, an inert gas or other environment could be provided, as shown in FIG. 3.

Figure 3:
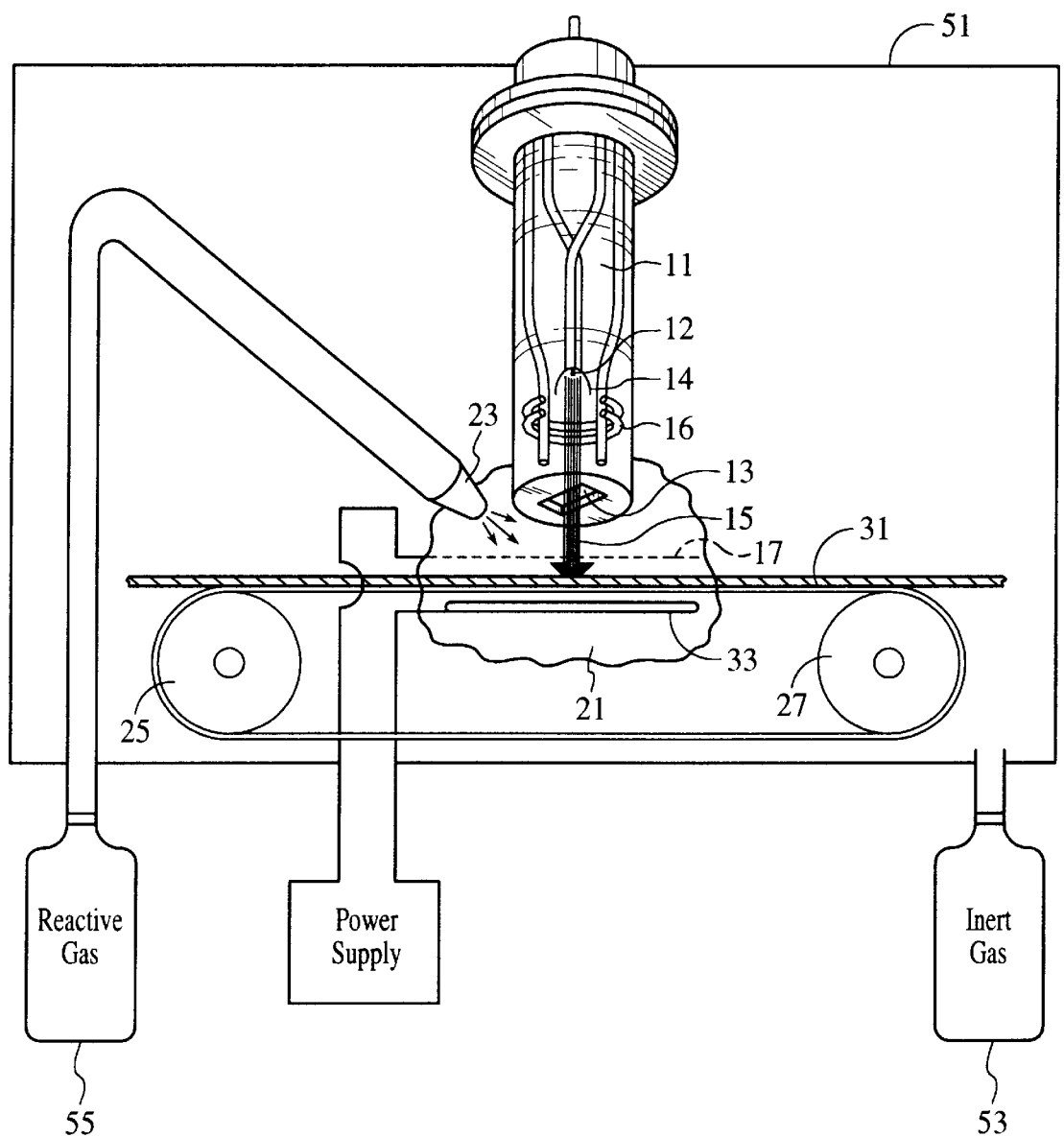
FIG. 3 is a side plan view of an electron beam tube in a chamber for plasma enhanced chemical vapor deposition with an electric sustainer field.

With reference to FIG. 3, a closed, gas-tight housing 51 encloses beam tube 11 which is projecting electron beam 15 through window 13 onto web surface 31. The plasma cloud 21 is formed in the vicinity of the beam, as described above. Housing 51 is first evacuated and then filled with an inert gas, such as argon, from a supply tank 53. A second gas, subject to cracking, is injected via nozzle 23 from supply tank 55. The reactive gas may be a metallo-organic gas such as a silicon-hydrocarbon compound. The reactive gas is cracked by the electron beam and plasma cloud so that a thin film of silicon or other material, depending upon the reactive gas, may be deposited on the web. A typical pressure for the inert gas is 760 Torr. A typical pressure for the reactive gas is similarly 760 Torr. The flow rate of the reactive gas is adjusted to maintain a slight oversupply in housing 51. Since cracking occurs most efficiently directly in front of beam 15, the nozzle 23 has an orifice in proximity to the beam, forcing reactive gas to traverse the beam path.

Figure 4:
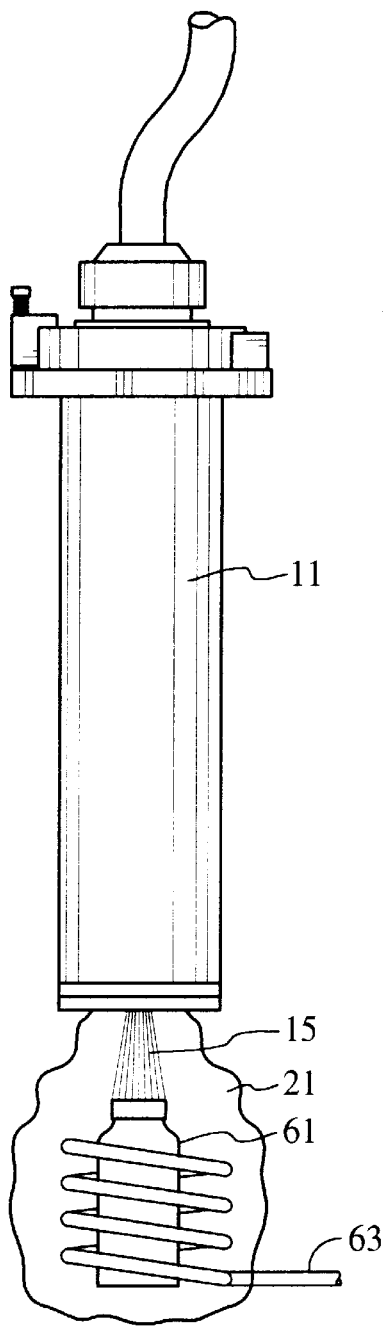
FIG. 4 is a side plan view of an electron beam tube emitting an electron beam into a magnetic sustainer field, coaxial with the beam tube, for surface treatment of a vial.

In FIG. 4 an electron tube 11 is used in a standard pressure ambient environment to sterilize and depyrogenate vial 61 to be filled with sterile liquids for health and medical applications. Initially the electron beam 15 is used solely to irradiate the internal walls of the empty vial and kill all microorganisms with a plasma cloud 21, the plasma formed by electrons from tube 11 and secondary electrons. Subsequently, an RF field is energized in electromagnetic coil 63 so that it provides additional energy to the secondary electrons near the wall surface to oxidize the bacterial debris to a state of inactiveness. The coil is a simple helically wound coil with an axial magnetic field. The coil may be operated in either a CW or pulsed mode. The magnetic field strength is at a level of hundreds of gases, a strength sufficient to cause electrons to follow flux lines. The dimensions of the coil are selected so that flux lines are near the walls of the vial. Electrons confined by the magnetic field lines impinge upon the surfaces of the vial causing depyrogenation. Vials may be placed within the coil robotically.

Figure 5:
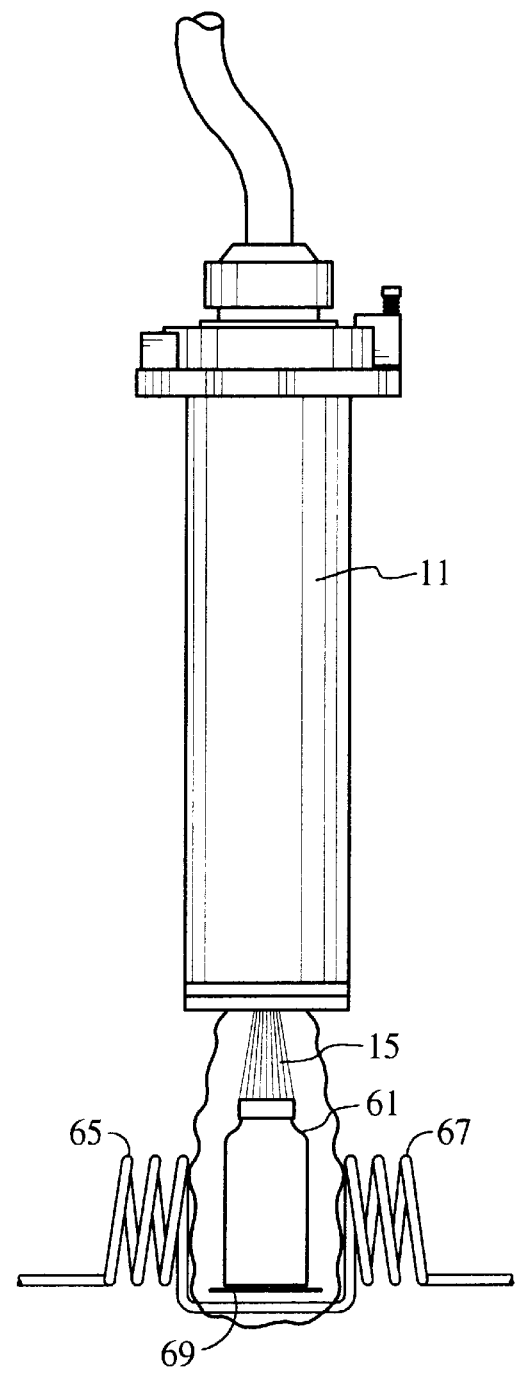
FIG. 5 is a side plan view of an electron beam tube emitting an electron beam into a magnetic sustainer field, transverse to the beam tube axis, for surface treatment of a vial.

FIG. 5 shows an arrangement similar to FIG. 4 with a helically wound coil having two sections 65 and 67 in series, with a common axial magnetic field which envelops vial 61.

The two coil sections 65 and 67 are spaced apart to allow a conveyor 69 to carry a series of vials on the conveyor between the sections. More precisely, vial 61 is carried by a conveyor belt 69 through the axial magnetic field of the coil sections 65 and 67. When the vial is in the path of electron beam 15 and in the center of the axial magnetic field it is momentarily stopped, allowing electrons to impinge upon the exterior surfaces of the vial. After one vial has been scrubbed by electrons, the conveyor is advanced and another vial is treated similarly.

What is claimed is:

1. A surface treatment apparatus comprising, an electron beam tube having a vacuum tube body with an electron source, an internal anode spaced apart from the electron source and a thin, electron permeable, gas impermeable membrane window near the anode arranged so that electrons accelerated by the anode will pass through the window into a gaseous ambient environment in a beam, the anode having a potential such that electrons passing though the window have an energy below 75 kV and form secondary electrons from collisions with the gaseous ambient environment, a field external to the beam tube and adjacent to the tube window and in the ambient environment, the electron beam passing into the field with electrons being trapped thereby, and a surface to be treated disposed external of the beam tube in the path of the beam and in the field.

2. The apparatus of claim 1 wherein the ambient environment is an air environment.

3. The apparatus of claim 1 further comprising a nozzle injecting a selected gas toward the surface to be treated and wherein the ambient environment is formed by the selected gas.

4. The apparatus of claim 3 further comprising a gas-tight housing enclosing the ambient environment formed by the selected gas.

5. The apparatus of claim 1 wherein the field is an electric field formed by an anode and a cathode external to the tube, with the field trapping secondary electrons generated by the beam.

6. The apparatus of claim 1 wherein the field is a magnetic field formed by a coil external to the tube, with the field trapping secondary electrons generated by the beam.

7. The apparatus of claim 5 wherein said surface to be treated is a web tensioned between two opposed members, the web passing between the anode and cathode external to the beam and through the electron trap.

8. The apparatus of claim 5 wherein said anode external to the beam tube is a conductive screen.

9. The apparatus of claim 5 wherein said cathode external to the beam tube is a conductive screen.

10. The apparatus of claim 5 wherein said surface to be treated is an silicon wafer disposed on a carrier passing between the anode and cathode external to the beam and through the electron trap.

11. The apparatus of claim 6 wherein the magnetic field has an axis parallel to the beam.

12. The apparatus of claim 6 wherein the magnetic field has an axis transverse to the beam.

13. A surface treatment apparatus comprising, an electron beam tube having a window through which an electron beam having an energy less than 75 kV is projected, a screen anode in front of said window in a position whereby the electron beam passes through the screen anode, a repeller cathode in front of said window downstream from the screen anode, having a voltage which is negative relative to the screen anode, whereby the electron beam is repelled by the repeller cathode into a volume between the repeller cathode and the screen anode, a target object supported in said volume, and a power supply means for maintaining voltages on the repeller cathode and screen anode, forming a plasma therebetween.

14. The apparatus of claim 13 wherein said electron beam tube has a stripe shaped beam.

15. The apparatus of claim 13 further comprising a plurality of electron beam tubes each having a window through which an electron beam is projected, said electron beams spanning a dimension of a target object.

16. The apparatus of claim 13 wherein the beam tube is disposed in a closed housing and a reactive gas is injected into the volume.

17. The apparatus of claim 13 wherein the target object is a web of material.

18. The apparatus of claim 13 wherein the target object is a silicon wafer.

19. The apparatus of claim 13 wherein the power supply is a d.c. supply.

20. The apparatus of claim 13 wherein the power supply is an a.c. supply operating at r.f. frequencies.

21. The apparatus of claim 16 wherein the reactive gas is an organo-metallic gas.

22. The apparatus of claim 21 wherein the organo-metallic gas is an organic compound of silicon, crackable by the electron beam and the plasma.

23. The apparatus of claim 13 wherein the screen electrode is a wire mesh screen.

24. A surface treatment apparatus comprising, an electron beam tube having a window through which an electron beam having an energy less than 75 kV is projected, ionizing ambient gas and producing secondary electrons, a helical coil having a magnetic field external to the beam tube but in proximity to the window, the magnetic field trapping the secondary electrons, and a target object supported in the magnetic field.

25. The apparatus of claim 24 wherein the field is parallel to the beam.

26. The apparatus of claim 24 wherein the field is transverse to the beam.

27. The apparatus of claim 24 wherein target objects are moved into the magnetic field by a conveyor.

* * * * *